United States Patent
Hannan et al.

(10) Patent No.: US 9,081,831 B2
(45) Date of Patent: Jul. 14, 2015

(54) METHODS AND SYSTEMS FOR PRESENTING DOCUMENT-SPECIFIC SNIPPETS

(71) Applicant: Google Inc., Mountain View, CA (US)

(72) Inventors: Kerry L. Hannan, Brooklyn, NY (US); Junli Xian, Jersey City, NJ (US); Christopher H. Rohrs, New York, NY (US)

(73) Assignee: Google Inc., Mountain View, CA (US)

( * ) Notice: Subject to any disclaimer, the term of this patent is extended or adjusted under 35 U.S.C. 154(b) by 189 days.

(21) Appl. No.: 13/831,247

(22) Filed: Mar. 14, 2013

(65) Prior Publication Data

US 2015/0169702 A1 Jun. 18, 2015

Related U.S. Application Data

(60) Provisional application No. 61/617,892, filed on Mar. 30, 2012.

(51) Int. Cl.
*G06F 17/30* (2006.01)

(52) U.S. Cl.
CPC ............................ *G06F 17/30554* (2013.01)

(58) Field of Classification Search
CPC ................ G06F 17/3005; G06F 17/30696
USPC ........................................................ 707/722
See application file for complete search history.

(56) References Cited

U.S. PATENT DOCUMENTS

| | | | |
|---|---|---|---|
| 5,999,925 A * | 12/1999 | Evans | 1/1 |
| 6,654,738 B2 * | 11/2003 | Nishioka et al. | 1/1 |
| 7,346,839 B2 | 3/2008 | Acharya et al. | |
| 7,512,601 B2 * | 3/2009 | Cucerzan et al. | 1/1 |
| 7,617,176 B2 * | 11/2009 | Zeng et al. | 1/1 |
| 7,836,391 B2 * | 11/2010 | Tong | 715/234 |
| 8,204,872 B2 * | 6/2012 | Hsieh et al. | 707/707 |
| 8,214,363 B2 * | 7/2012 | Chaudhary | 707/736 |
| 8,370,345 B2 * | 2/2013 | Spangler | 707/728 |
| 8,407,231 B2 | 3/2013 | Acharya et al. | |
| 8,549,014 B2 | 10/2013 | Acharya et al. | |
| 8,584,011 B2 * | 11/2013 | Teevan et al. | 715/255 |
| 8,639,690 B2 | 1/2014 | Dean et al. | |
| 8,862,573 B2 * | 10/2014 | Musgrove | 707/722 |
| 2005/0076003 A1 * | 4/2005 | DuBose et al. | 707/1 |

(Continued)

OTHER PUBLICATIONS

Ferragina, P., et al., "A personalized search engine based on Web-snippet hierarchical clustering", Software: Practice and Experience, vol. 38, Issue 2, Feb. 2008, pp. 189-225.*

(Continued)

*Primary Examiner* — Robert Stevens
(74) *Attorney, Agent, or Firm* — Fish & Richardson P.C.

(57) ABSTRACT

The present disclosure describes systems and methods for presenting document-specific snippets for documents in site-specific search results. One example method according to the present disclosure includes determining a set of documents that are responsive to a search query, the set of documents including (i) a first document and (ii) a second document that is referenced by the first document, identifying a set of representative keywords associated with the second document, identifying a snippet that (i) is associated with the second document, and (ii) includes one or more terms from the set of representative keywords, and providing a search results page that identifies the first document, the second document, and the snippet.

20 Claims, 4 Drawing Sheets

(56) References Cited

U.S. PATENT DOCUMENTS

| | | | |
|---|---|---|---|
| 2005/0177555 A1* | 8/2005 | Alpert et al. | 707/3 |
| 2005/0278314 A1* | 12/2005 | Buchheit | 707/3 |
| 2007/0239662 A1* | 10/2007 | Fontes et al. | 707/2 |
| 2008/0235209 A1* | 9/2008 | Rathod et al. | 707/5 |
| 2011/0252030 A1* | 10/2011 | Spangler | 707/729 |
| 2011/0282651 A1* | 11/2011 | Nygaard et al. | 704/9 |
| 2011/0313992 A1* | 12/2011 | Groeneveld et al. | 707/706 |
| 2012/0166973 A1* | 6/2012 | Gurevich et al. | 715/760 |
| 2012/0240037 A1* | 9/2012 | Migos et al. | 715/255 |
| 2012/0303656 A1* | 11/2012 | Iida et al. | 707/769 |

OTHER PUBLICATIONS

Wang, Yitong, et al., "On Combining Link and Contents Information for Web Page Clustering", DEXA 2002, LNCS 2453, Springer-Verlag, Heidelberg, © 2002, pp. 902-913.*

Sahami, Mehran, et al., "A Web-based Kernel Function for Measuring the Similarity of Short Text Snippets", WWW 2006, Edinburgh, Scotland, May 23-26, 2006, pp. 377-386.*

Huang, Yu, et al., "Query Biased Snippet Generation in XML Search", SIGMOD '08, Vancouver, BC, Canada, Jun. 9-12, 2008, pp. 315-326.*

* cited by examiner

METHODS AND SYSTEMS FOR PRESENTING DOCUMENT-SPECIFIC SNIPPETS

CROSS-REFERENCE TO RELATED APPLICATION

This application claims the benefit of U.S. Provisional Application Ser. No. 61/617,892, filed on Mar. 30, 2012, which is incorporated herein by reference.

FIELD

The present disclosure relates generally to search engines.

BACKGROUND

Internet search engines aim to identify documents (or resources), e.g., web pages, images, text documents, multimedia content, that are relevant to a user's needs, and to present information about the documents in a manner that is most useful to the user. Internet search engines return a set of search results in response to a user-submitted query. In some situations, each of the search results can include a title for a represented resource, a selectable link that can reside alone or behind the title and a snippet of content from the document. The snippet of content can include one or more words, phrases, clauses, or sentences extracted from the textual content of the document to give the user some insight to content in the document.

SUMMARY

According to one aspect of the present disclosure, a search system may select a set of search results that identifies a main document on a web site, as well as other documents on the same site that are referenced by the main document ("sub-documents"). Under this circumstance, instead of presenting separate search results for each document, the search system may generate a single, cohesive search result for these documents that includes a link to the main document and a snippet of text that is derived from the main document, as well as links to each of the sub-documents and snippets of text that are derived from each sub-document. Notably, the snippets of text for each sub-document are selected based on some representative text from each sub-document, e.g., a title of or keywords associated with each sub-document, and not necessarily based on representative text from the main document or the terms of the search query that was used to select the set of search results.

The present disclosure describes systems and methods for presenting document-specific snippets for documents in site-specific search results. One example method according to the present disclosure includes determining a set of documents that are responsive to a search query, the set of documents including (i) a first document and (ii) a second document that is referenced by the first document, identifying a set of representative keywords associated with the second document, identifying a snippet that (i) is associated with the second document, and (ii) includes one or more terms from the set of representative keywords, and providing a search results page that identifies the first document, the second document, and the snippet.

The details of one or more implementations of the subject matter of this disclosure are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

The present disclosure relates generally to the presenting of search results, and specifically to methods and systems for presenting document-specific snippets. In some implementations, a search engine according to the present disclosure may receive a site-navigational query relating to a particular web site or domain. For example, a query may contain the text "XYZ" may be determined to be a site-navigational query related to the domain "XYZ.com." In response to such a query, the search may present a site-specific search result including a main document (e.g., a home page for the site) and one or more sub-documents referred to by the main document. The search engine may present document-specific snippets associated with the main document and the sub-documents as part of the search results. For the main document, the search engine may identify and display a snippet including one or more terms from the search query. For each of the sub-documents, the search engine may identify and display a snippet related to the subject matter of the sub-document. For example, the search engine may identify that a sub-document is related to "NEWS" by examining one or more elements of the sub-document, such as, for example, the title, meta-tags, leading text, or other elements. The search engine may identify a set of representative keywords for the sub-document. For example, the search engine may analyze the elements of a sub-document and determine that the sub-document is related to "NEWS," and thus associate a representative keyword of "NEWS" with the sub-document. The search engine may then identify occurrences of the representative keyword ("NEWS") in the sub-document. It may then select a snippet from the sub-document based on this identification, and display the snippet with the sub-document search result in a search result list.

Figure 1:
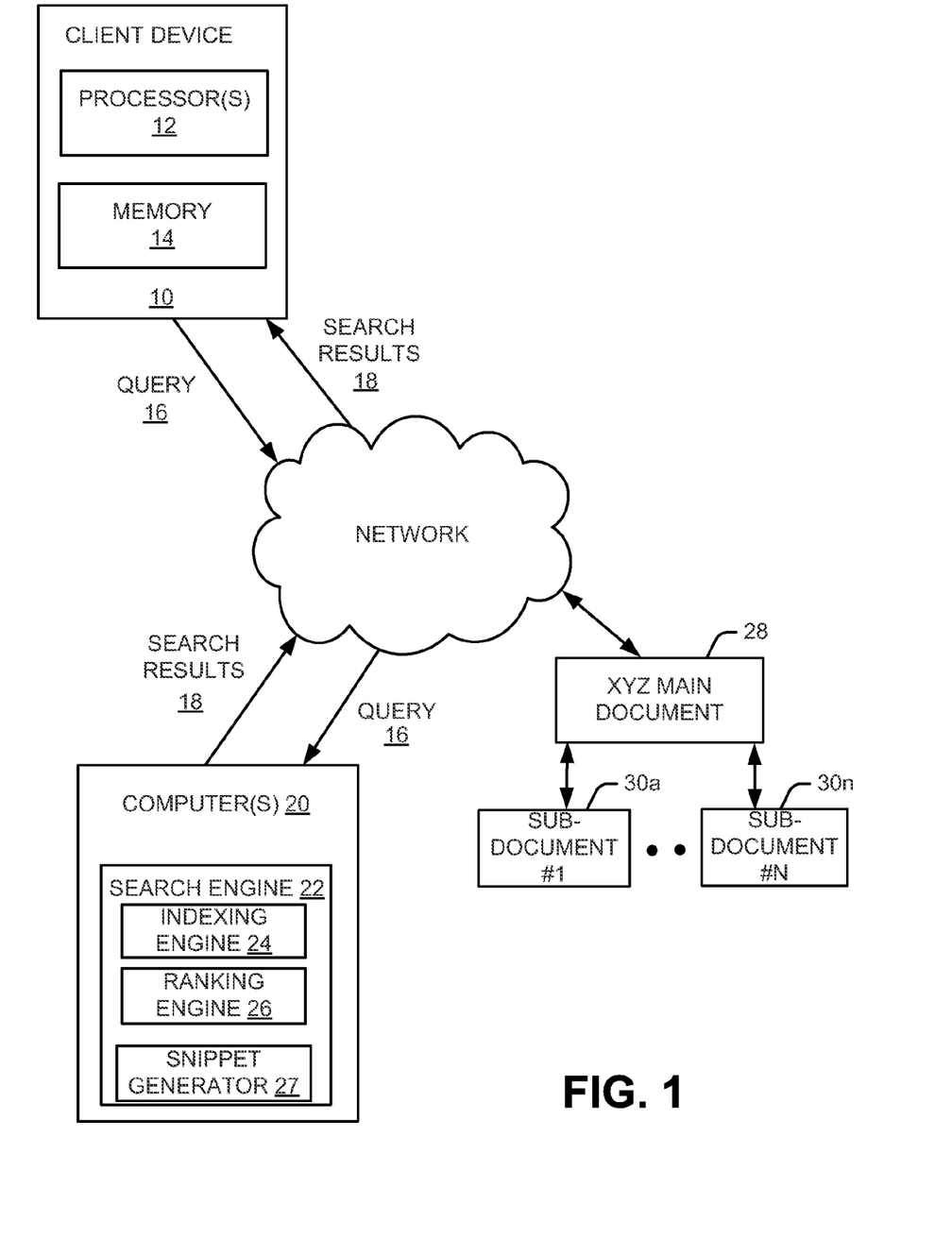
FIG. 1 illustrates an example search system.

FIG. 1 shows an example search engine 22 for providing search results relevant to submitted queries as can be implemented in an internet, an intranet, or another client and server environment. The search engine 22 can reside on or be distributed across one or more computers 20, e.g., one or more server computers having associated processors and memories. A user can interact with the search engine 22 through a client device 10. For example, the client device 10 can be a computer coupled to the search engine 22 through a local area network (LAN) or a wide area network (WAN), such as the Internet. In some implementations, the search engine 22 and the client device 10 can reside on one machine. For example, a user can install a desktop search application on the client device 10. The client device 10 will generally include memory 14, e.g., random access memory (RAM), read only memory (ROM), etc., and one or more processors 12.

A user can submit a query 16 to the search engine 22 residing on or distributed across the one or more computers 20. The query 16 is transmitted through a network to the search engine 22. The search engine 22 can be implemented as, for example, computer programs running on the one or more computers 20 in one or more locations that are coupled to each other through a network. The search engine 22 responds to the query 16 by generating search results 18, which are transmitted through the network to the client device 10 in a form that can be presented to the user, e.g., as a search results web page to be displayed in a web browser running on the client device 10.

When the query 16 is received by the search engine 22, the search engine 22 identifies documents that satisfy the query 16. The search engine 22 can include an indexing engine 24 that indexes documents, e.g., web pages, images, or news articles on the Internet, found in a corpus, e.g., a collection or repository of content, an index database that stores the index information, and a ranking engine 26 to rank the documents that match the query 16. The search engine 22 can transmit the search results 18 through the network to the client device 10 for presentation to the user.

In some implementations, the search engine 22 may include a snippet generator 27. The snippet generator 27 may be a component or set of components operable to accept as input a document identifier and a set of words to search for in the document, and to produce as output a snippet of text including some or all of the set of words. In some cases, the snippet generator 27 may take as input a Uniform Resource Locator (URL) associated with the document to search and a set of words to search for, and produce as output a snippet of text associated with the document including the most relevant occurrence of all or part of the string of text. The snippet generator 27 may return an indication of the position of the identified snippet within the document, such as a character offset from the beginning of the document or an indication of the document element including the snippet (e.g., title, body, etc.).

Documents include, for example, web pages of various formats, such as HTML, XML, XHTML, Portable Document Format (PDF) files, and word processor, database, and application program document files, audio, video, or any other documents or information of any type whatsoever made available on a network, such as the Internet, a personal computer, or other computing or storage means. The implementations described herein are described generally in relation to HTML files or documents, but other implementations may operate on any type of document, including any type of image.

In some implementations, a query may result in the search engine 22 obtaining a set of search results that include a set of results belonging to a particular site in response to the query. The particular site may have a main document and a plurality of sub-documents associated with the particular site. Sub-documents are documents that are related to the main document. In some instances, the sub-documents may be documents referenced directly by the main document, or may be referenced indirectly by the main document. For example, a sub-document could be referenced indirectly by the main document in a case where the main document refers to a document that then refers to the sub-document. In some cases, the sub-documents could be different documents than the main document or different portions of the main document. For example, the main document may be a home page of the particular site and the sub-documents may include sub-topics associated with the main document. For example, as illustrated in FIG. 1, a particular site XYZ includes an XYZ main document 28 and a plurality of sub-documents #1-N, where N is an integer equal or greater than one. Both the XYZ main document 28 and the plurality sub-documents 30$a$-$n$ are accessible from the network.

In some implementations, the user may provide a query, e.g., a site-navigational query, that includes one or more terms that provide an indication of a user's intent or desire to retrieve content associated with a particular site. The site-navigational query can result in the search engine 22 obtaining a set of same site search results, as discussed above, in response to the query. The search results 18 including the set of results can be presented by the one or more computers 20. The presenting can be in the form of one or more of aggregating the search results and/or formatting the search results at the one or more computers 20, transmitting the search results over the network, receiving the search results at the client device 10 and displaying of the search results at the client device 10. The client device 10 can display the search results in a web page display on a browser executing on the client device 10.

Figure 2:
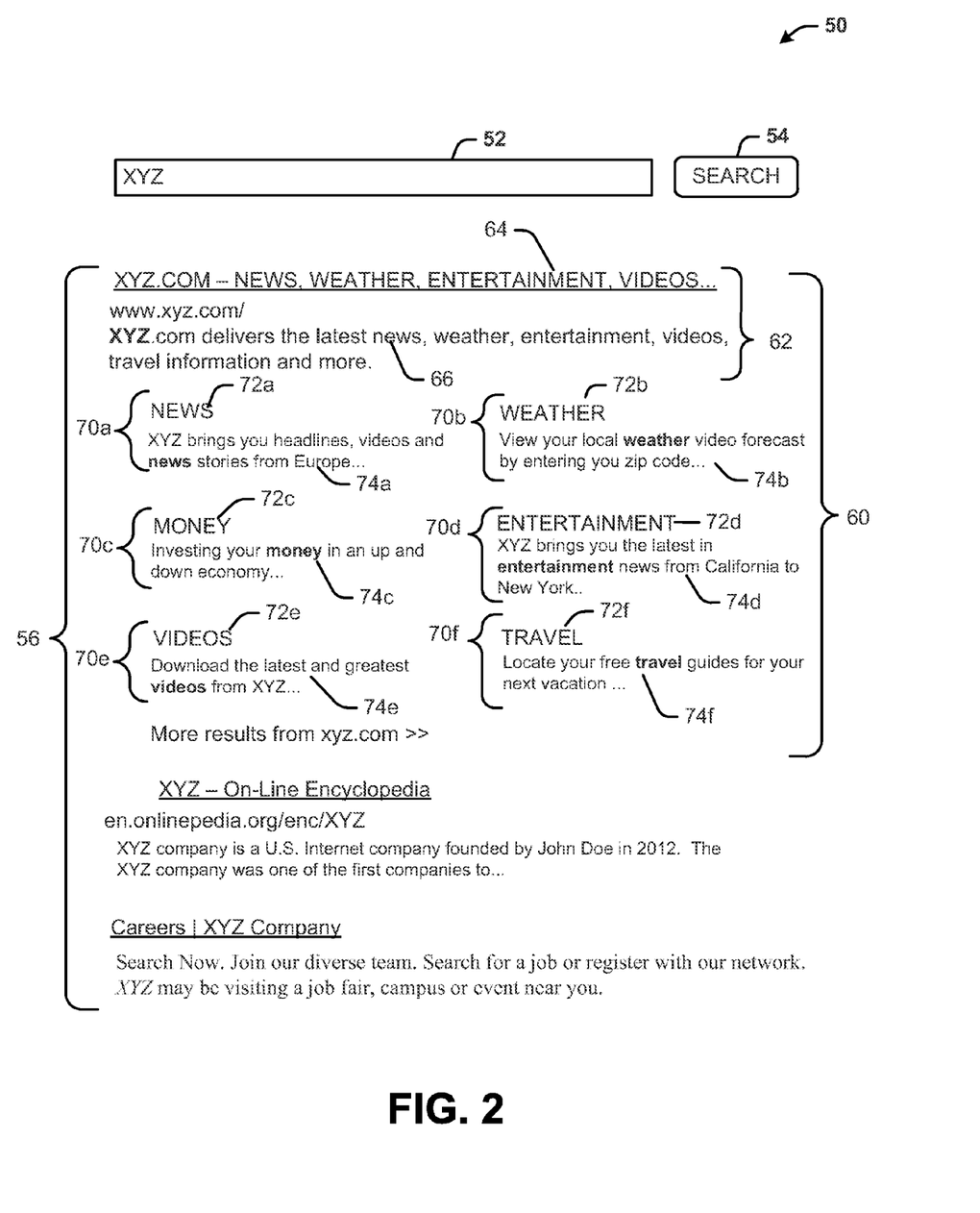
FIG. 2 illustrates an example web page display of search results for a same-site query.

FIG. 2 illustrates an example web page display 50 of search results for a query that can be displayed on a browser at the client device 10 in accordance with some implementations. The web page display 50 includes a query box 52 for inserting or typing text. The text can be inserted or typed followed by clicking on a search button 54 with a pointer to invoke a query. Additionally, the inserting or typing can automatically invoke a query and the display of search results. In the example of FIG. 2, a query, e.g., original query, that includes the term XYZ is typed or inserted in the query box 52, which invokes a query of the term XYZ to the search engine 22.

In this particular example, the term XYZ is also a name of the site XYZ, and therefore, the query corresponds to a site-navigational query since it appears that the user has an intent or desire to retrieve content associated with the site XYZ. In response to the query, a set of search results 56 including a same site search result set 60 are presented and displayed on the web page display 50. The same site search result set 60 may have also been obtained and presented in response to other site-navigational queries, such as, for example, the term XYZ in conjunction with a sub-topic, e.g., News, Weather, Travel, etc., or terms that are strongly related to XYZ, even though they do not include the XYZ site identifier itself. Furthermore, the same site search result set 60 may have also been obtained and presented in response to other queries, as previously stated.

Each of the search results 56 can include a title for a document (or resource), a selectable link separate or integrated with the title and a snippet of content from the document. The snippet of content can include one or more words, phrases, clauses, or sentences extracted from the textual content of the document. A phrase is a meaningful content of two or more words. The same site search result 60 is arranged in a grouping that includes a main document search result 62 having a main title 64 and an associated snippet 66 and a subsequent group of sub-document results 70$a$-$f$ having sub-document titles 72$a$-$f$ and associated snippets 74$a$-$f$.

In some implementations, the search engine 22 can obtain the snippet 66 from a main document represented by the main document search result 62 based on one or more terms, e.g., XYZ, in the query, e.g, original query, provided by the user. The search engine can further obtain the document-specific snippets 74$a$-$f$ for each of the sub-documents represented by the sub-document search results 70$a$-$f$. The search engine 22 may identify the document-specific snippets 74$a$-$f$ by identifying occurences within the sub-document of a set of representative keywords of each sub-document, such as the titles 72$a$-$f$.

In some implementations, the set of representative keywords can be text associated with the sub-document, which may include text from a title of the sub-document or other text that is topically related to the sub-document. The set of representative keywords can also include text from a meta-description of the sub-document such as a meta-tag, or other elements or combinations of elements from the sub-document.

In some implementations, the original query will invoke or cause another component to return a set of same-site search results that includes a plurality of sub-documents. The sub-documents can be analyzed to determine a set of representative keywords associated with each sub-document. In some implementations, each sub-document can be parsed to locate the set of representative keywords. Each sub-document can also be parsed to remove boiler plate tags, links and other non-topic specific information from the sub-document to locate the set of representative keywords. In some cases, the set of representative keywords may be truncated prior to identifying document-specific snippets. The set of representative keywords can be used to identify a document-specific snippet associated with the sub-document by identifying occurrences of the set of representative keywords within different portions of the sub-documents. In some implementations, the leading text of the sub-document, the meta-description of the sub-document and/or other text of the sub-document may analyzed for occurrences of the set of representative keywords in order to determine a document-specific snippet for the sub-document. In some implementations, the document-specific snippet may contain all words from the set of representative keywords. The document-specific snippet may also contain only certain words from the set of representative keywords.

In some implementations, the document-specific snippet may be identified using a set of representative keywords from the sub-document. The set of representative keywords can be a variety of different elements specific to the sub-document that can more contextually or topically focus the snippet to the sub-document topic, as opposed to contextually or topically focusing the snippet from the sub-document based on the original query. For example, a site-navigational query for XYZ may result in a document-specific snippet for the main document (the homepage of XYZ.com) including the text "XYZ." However, for a sub-document of XYZ.com having a set of representative keywords of "News," the document-specific snippet for that sub-document may be focused more on the specific topic of that sub-document (e.g., "News"). In some implementations, the specific topic of the sub-document may be the title of the document. For example, the topic of the sub-document may be the title of the document specified in the "<title>" in the HyperText Markup Language (HTML) source of the page. The title may also be an alternative title generated specifically for the sub-document. In other examples, the set of representative keywords may be a name or identifier of a topic, subject, or entity that has been associated with the sub-document.

As illustrated in the web page display 50, the snippet 66 from the main document represented by the main document search result 62 includes the term XYZ, shown in bold, and the associated text around the element XYZ. Additionally, each of the document-specific snippets 74a-f include the document-specific element, e.g., title 72a-f of the each of the sub-document search results 70a-f, associated with that sub-document, shown in bold, and associated text around the document-specific element. For example, document-specific snippet 74a associated with sub-document search result 70a includes the term "NEWS" from the title 72a associated with the sub-document search result 70a. In another example, document-specific snippet 74b associated with sub-document search result 70b includes the term "WEATHER" from the title 72b associated with the sub-document search result 70b.

Figure 3:
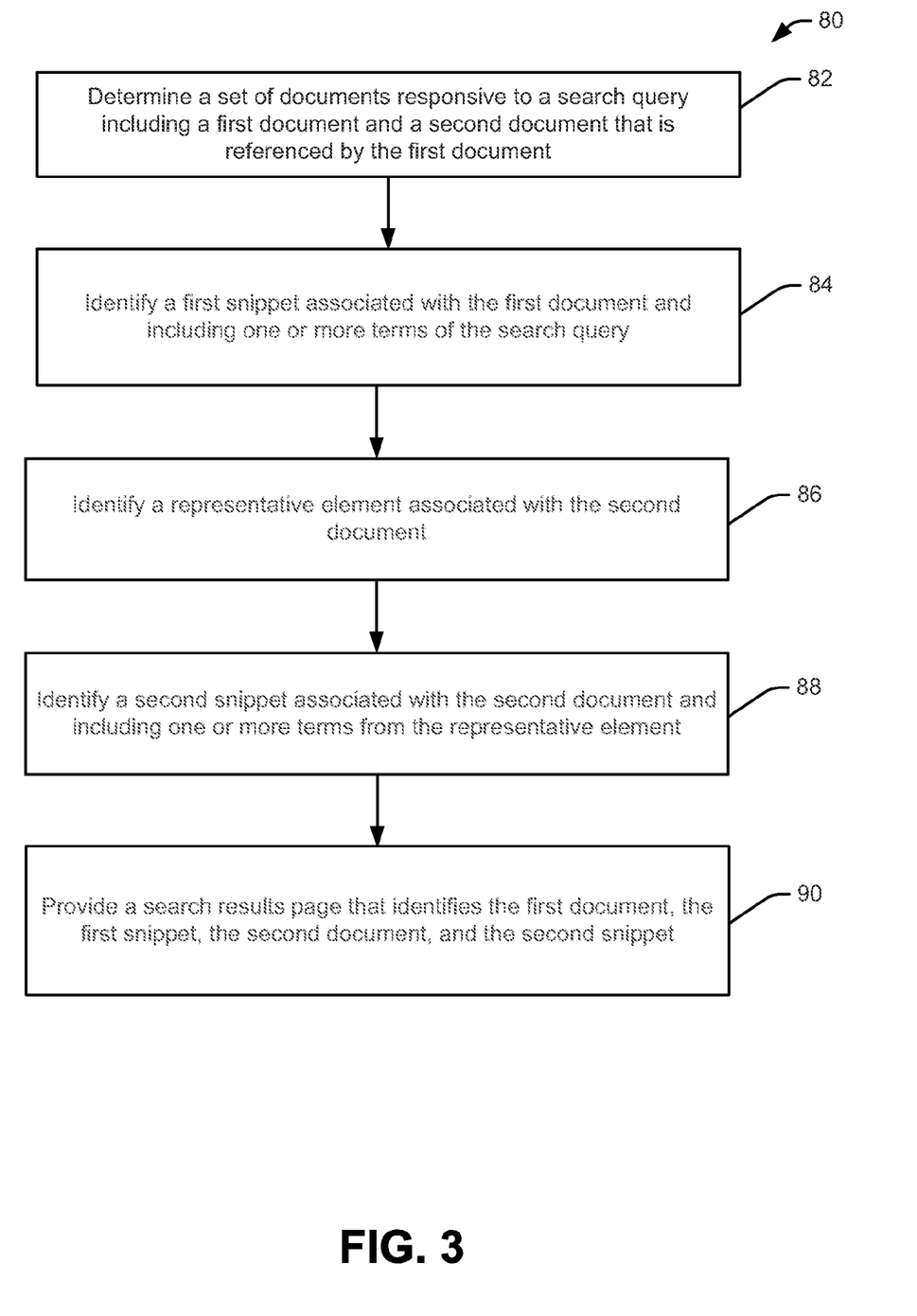
FIG. 3 illustrates an example method for presenting document specific snippets.

FIG. 3 illustrates an example method 80 for presenting document-specific snippets. At 82, a set of documents is determined responsive to a search query including a first document and a second document that is referenced by the first document. In some implementations, the search query is a site-navigational query and the set of documents include a main document and one or more sub-documents referred to by the main document. In some cases, the first document is the main document and the second document is one of the one or more sub-documents.

At 84, a first snippet associated with the first document and including one or more terms of the search query is identified. In some implementations, the first snippet is identified by a component of a search engine, such as the snippet generator discussed relative to FIG. 1.

At 86, a set of representative keywords associated with the second document is identified. In some cases, the set of representative keywords may be text from the title of the second document, meta-tags of the second document, an identifier of an entity associated with the second document, or from any other suitable element of, or derived from, the second document.

At 88, a second snippet associated with the second document and including one or more terms from the set of representative keywords is identified. In some implementations, the second snippet may be identified also based at least in part on the one or more terms of the search query.

At 90, a search results page is provided that identifies the first document, the first snippet, the second document, and the second snippet. In some implementations, the search results page is provided over a network to requesting client, such as, for example, in response to a Hypertext Transfer Protocol (HTTP) request. The search results page may also be provided and displayed to a user, such as by a web browser.

Figure 4:
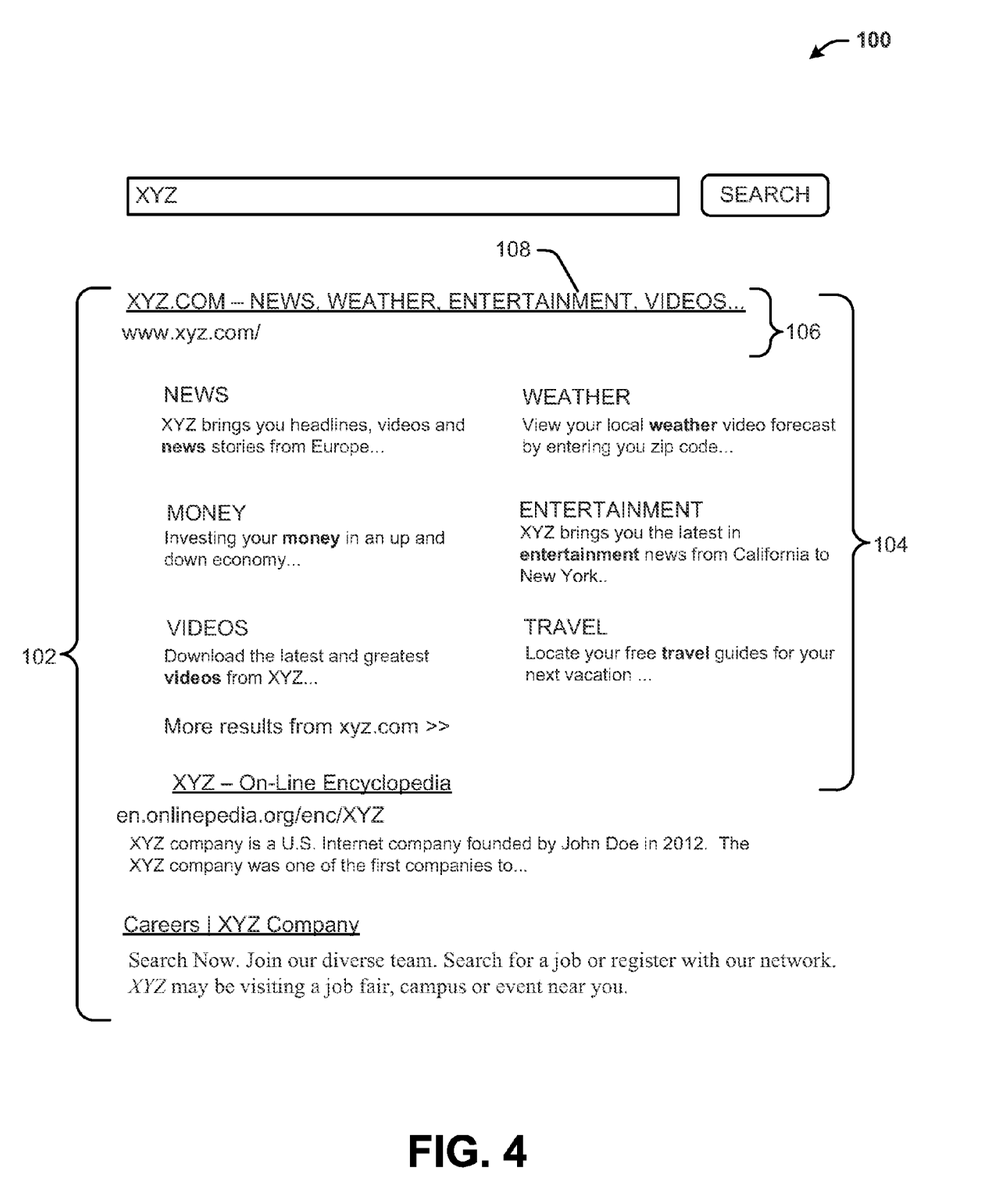
FIG. 4 illustrates an example web page display of search results for a same-site query without a snippet associated with the main document.

FIG. 4 illustrates an example web page display 100 of search results for a same-site query without a snippet associated with the main document.

In this particular example, a set of search results 102 including a same site search result set 104 are presented and displayed on the web page display 100. The same site search result set 104 may be obtained and generated by the same mechanisms described relative to same site search result set 60 relative to FIG. 2. The same site search result set 104 includes a main document search result 106 including a title 108. The main document search result 106 differs from the main document search result 62 from FIG. 2 in that the main document search result 106 lacks an associated snippet (e.g., snippet 66 from FIG. 2). In some implementations, the presence of a snippet in the main document search result 106 may be controlled by a setting associated with the search engine. The presence of a snippet in the main document search result 106 may also be controlled by an analysis of the page associated with the main document search result 106. For example, the search engine may determine that a snippet should not be displayed for certain main documents, and should be displayed for others based on an analysis of the content of the page. In some cases, the page associated with the main document search result 106 may include a tag or directive indicating to the search engine that a snippet should or should not be displayed in the main document search result 106.

In some implementations, it may be determined that no snippets in the sub-document exist including the representative keywords. In such a case, a pre-determined portion of the sub-document may be identified and displayed in place of the snippet. For example, leading text from the sub-document may be displayed in place of the snippet. In some instances, the process of identifying the representative keywords may be omitted entirely, and the pre-determined portion of the sub-document may be identified and displayed in place of the snippet.

Implementations of the subject matter and the functional operations described in this specification can be implemented in digital electronic circuitry, or in computer software, firmware, or hardware, including the structures disclosed in this specification and their structural equivalents, or in combinations of one or more of them. Implementations of the subject matter described in this specification can be implemented as one or more computer program products, i.e., one or more modules of computer program instructions encoded on a tangible program carrier for execution by, or to control the operation of, data processing apparatus. The tangible program carrier can be a computer-readable medium. The computer-readable medium can be a machine-readable storage device, a machine-readable storage substrate, a memory device, or a combination of one or more of them.

The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them.

A computer program, also known as a program, software, software application, script, or code, can be written in any form of programming language, including compiled or interpreted languages, or declarative or procedural languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub-programs, or portions of code. A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, to name just a few.

Computer-readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, implementations of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well, for example, feedback provided to the user can be any form of sensory feedback, e.g., visual feedback, auditory feedback, or tactile feedback and input from the user can be received in any form, including acoustic, speech, or tactile input.

Implementations of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

While this specification contains many specific implementation details, these should not be construed as limitations on the scope of any invention or on the scope of what may be claimed, but rather as descriptions of features that may be specific to particular implementations of particular inventions. Certain features that are described in this specification in the context of separate implementations can also be implemented in combination in a single implementation. Conversely, various features that are described in the context of a single implementation can also be implemented in multiple implementations separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation and/or integration of various system modules and components in the implementations described above should not be understood as requiring such separation and/or integration in all implementations, and it should be understood that the described program components and systems can generally be integrated together in a single software product or packaged into multiple software products.

Particular implementations of the subject matter have been described. Other implementations, alterations, and permutations of the described implementations are within the scope of the following claims as will be apparent to those skilled in the art. For example, the actions recited in the claims can be performed in a different order and still achieve desirable results.

Accordingly, the above description of example implementations does not define or constrain this disclosure. Other changes, substitutions, and alterations are also possible without departing from the spirit and scope of this disclosure.

What is claimed is:

1. A computer-implemented method comprising:
    receiving a search query including one or more query terms;
    obtaining a set of documents that are identified as responsive to a search query, the set of documents including (i) a first document comprising a home page for a site, and (ii) a second document on the site that is linked to by the first document;
    identifying a set of representative keywords that are (i) associated with the second document and (ii) not included among the query terms;
    obtaining (i) a snippet for the first document, that includes one or more of the query terms, and (ii) a snippet for the second document that is linked to by the first document, that includes one or more terms from the set of representative keywords;
    generating a combined search result for both the first document and the second document that is linked to by the first document, wherein the combined search result includes the snippet for the first document and the snippet for the second document; and
    providing a search results page that includes the combined search result in response to the search query.

2. The method of claim 1, further comprising:
    obtaining an additional snippet that (i) is associated with the first document, and (ii) includes one or more terms of the search query, wherein the provided search results page further identifies the additional snippet.

3. The method of claim 1, wherein the set of representative keywords comprises text from a title of the second document.

4. The method of claim 1, further comprising:
    generating an alternate title for the second document, wherein the set of representative keywords comprises text from the alternate title of the second document.

5. The method of claim 1, wherein the set of documents responsive to the search query includes a set of site-navigational search results including a main document and one or more sub-documents, and the first document is the main document and the second document is one of the one or more sub-documents.

6. The method of claim 1, wherein obtaining the snippet includes identifying a portion of the second document that is relevant to the set of representative keywords.

7. The method of claim 1, wherein the snippet also includes at least a portion of the search query.

8. A tangible, non-transitory computer-readable medium encoded with instructions for causing one or more processors to perform operations comprising:
    receiving a search query including one or more query terms;
    obtaining a set of documents that are identified as responsive to a search query, the set of documents including (i) a first document comprising a home page for a site, and (ii) a second document on the site that is linked to by the first document;
    identifying a set of representative keywords that are (i) associated with the second document and (ii) not included among the query terms;
    obtaining (i) a snippet for the first document, that includes one or more of the query terms, and (ii) a snippet for the second document that is linked to by the first document, that includes one or more terms from the set of representative keywords;
    generating a combined search result for both the first document and the second document that is linked to by the first document, wherein the combined search result includes the snippet for the first document and the snippet for the second document; and
    providing a search results page that includes the combined search result in response to the search query.

9. The computer-readable medium of claim 8, the operations further comprising:
    obtaining an additional snippet that (i) is associated with the first document, and (ii) includes one or more terms of the search query, wherein the provided search results page further identifies the additional snippet.

10. The computer-readable medium of claim 8, wherein the set of representative keywords comprises text from a title of the second document.

11. The computer-readable medium of claim 8, the operations further comprising:
    generating an alternate title for the second document, wherein the set of representative keywords comprises text from the alternate title of the second document.

12. The computer-readable medium of claim 8, wherein the set of documents responsive to the search query includes a set of site-navigational search results including a main document and one or more sub-documents, and the first document is the main document and the second document is one of the one or more sub-documents.

13. The computer-readable medium of claim 8, wherein obtaining the snippet includes identifying a portion of the second document that is relevant to the set of representative keywords.

14. The computer-readable medium of claim 8, wherein the snippet also includes at least a portion of the search query.

15. A system, comprising:
    memory operable to store a business process; and
    at least one hardware processor interoperably coupled to the memory and operable to:
        receive a search query including one or more query terms;
        obtain a set of documents that are identified as responsive to a search query, the set of documents including (i) a first document comprising a home page for a site, and (ii) a second document on the site that is linked to by the first document;

identify a set of representative keywords that are (i) associated with the second document and (ii) not included among the query terms;

obtain (i) a snippet for the first document, that includes one or more of the query terms, and (ii) a snippet for the second document that is linked to by the first document, that includes one or more terms from the set of representative keywords;

generate a combined search result for both the first document and the second document that is linked to by the first document, wherein the combined search result includes the snippet for the first document and the snippet for the second document; and provide a search results page that includes the combined search result in response to the search query.

16. The system of claim 15, the processor further operable to: obtain an additional snippet that (i) is associated with the first document, and (ii) includes one or more terms of the search query, wherein the provided search results page further identifies the additional snippet.

17. The system of claim 15, wherein the set of representative keywords comprises text from a title of the second document.

18. The system of claim 15, the processor further operable to:

generate an alternate title for the second document, wherein the set of representative keywords comprises text from the alternate title of the second document.

19. The system of claim 15, wherein the set of documents responsive to the search query includes a set of site-navigational search results including a main document and one or more sub-documents, and the first document is the main document and the second document is one of the one or more sub-documents.

20. The system of claim 15, wherein obtaining the snippet includes identifying a portion of the second document that is relevant to the set of representative keywords.

* * * * *